Patented June 18, 1935

2,005,571

UNITED STATES PATENT OFFICE 2,005,571

N[PARA - (BETA - NAPHTHYL-AMINO) PHENYL] MORPHOLINE AND ITS PRODUCTION

George Clifford Strouse, Wilmington, Del., assignor to E. I. du Pont de Nemours & Company, Wilmington, Del., a corporation of Delaware No Drawing. Application June 25, 1932,
Serial No. 619,279

7 Claims. (Cl. 260—28)

This invention relates to a new chemical compound and method of preparing the same and particularly to a derivative of N(para-amino-phenyl) morpholine.

N(para - amino - phenyl) morpholine and its acetyl derivative together with a method for preparing the same have been described in a copending application of H. A. Lubs, Serial No. 616,745, filed June 11, 1932.

An object of the present invention is to provide a new chemical compound and particularly a new derivative of N(para-amino-phenyl) morpholine. A further object is to provide a method for preparing a new chemical compound and particularly a derivative of N(para-amino-phenyl) morpholine. Still further objects are to provide a new composition of matter and to advance the art. Other objects will appear hereinafter.

These objects may be accomplished according to my invention which comprises reacting beta-naphthol with N(para-amino-phenyl) morpholine in the presence of sodium bisulfite, as a condensing agent, whereby the beta-naphthyl derivative of N(para-amino-phenyl) morpholine is produced. This new compound is given the name: N[para - (beta - naphthyl - amino) - phenyl] morpholine and has the following probable formula:

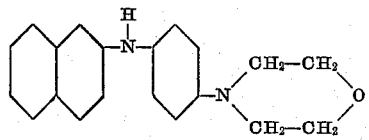

I have found that this compound is a valuable material. It is useful for preserving rubber and also as an intermediate in the manufacture of dyes.

In order to more fully illustrate my invention and indicate the preferred mode of preparing this new compound the following example is given:

*Example.*—Fifty-two (52) grams of beta-naphthol, 67 grams of N(para-amino-phenyl) morpholine, 293 grams of sodium bisulfite, and 1225 grams of water are refluxed in a glass vessel for 70 hours. After the reaction mixture has cooled, the product is separated by filtration and extracted with hot water and dilute sodium hydroxide solution to remove any unchanged N(para-amino-phenyl) morpholine and beta-naphthol. The crude product may be recrystallized from the mono-ethyl-ether of ethylene-glycol.

When prepared and purified as above described the N[para - (beta - naphthyl - amino) - phenyl] morpholine is a slightly grayish white crystalline powder melting at 188–189° C.

While I have disclosed a specific method of producing my new compound, employing particular proportions of specific reagents, it will be evident that various changes and modifications may be made in the reagents and proportions thereof and conditions under which they are employed, without departing from the spirit of my invention. Accordingly, the scope of my invention is to be limited solely by the appended claims construed as broadly as is permissible in view of the prior art.

I claim:

1. The method of preparing N[para(beta-naphthyl-amino) phenyl] morpholine which comprises condensing beta-naphthol with N(p-amino-phenyl) morpholine at reflux temperatures.

2. The method of preparing N[para(beta-naphthyl-amino) phenyl] morpholine which comprises condensing beta-naphthol with N(p-amino-phenyl) morpholine in the presence of sodium bisulfite at reflux temperatures.

3. The method of preparing N[para(beta-naphthyl-amino) phenyl] morpholine which comprises condensing beta-naphthol with N(p-amino-phenyl) morpholine in an aqueous solution of sodium bisulfite at reflux temperatures.

4. The method of preparing N[para(beta-naphthyl-amino) phenyl] morpholine which comprises reacting equimolecular proportions of beta-naphthol and N(p-amino-phenyl-morpholine at reflux temperatures.

5. The method of preparing N[para(beta-naphthyl-amino) phenyl] morpholine which comprises reacting equimolecular proportions of beta-naphthol and N(p-amino-phenyl) morpholine in the presence of sodium bisulfite at reflux temperatures.

6. The method of preparing N[para(beta-naphthyl-amino) phenyl] morpholine which comprises reacting equimolecular proportions of beta-naphthol and N(p-amino-phenyl) morpholine in an aqueous solution of sodium bisulfite.

7. N[para(beta-naphthyl-amino) phenyl] morpholine.

GEORGE CLIFFORD STROUSE.